US010569304B2

(12) United States Patent
Bellec et al.

(10) Patent No.: US 10,569,304 B2
(45) Date of Patent: Feb. 25, 2020

(54) VIBRATORY SYSTEM COMPRISING SHAFT LINES, AND A CORRESPONDING MACHINE AND METHOD

(71) Applicant: Metso Minerals, Inc., Tampere (FI)

(72) Inventors: David Bellec, Hurigny (FR); David Alacoque, Lurcy (FR)

(73) Assignee: Metso Minerals, Inc., Tampere (FI)

( * ) Notice: Subject to any disclaimer, the term of this patent is extended or adjusted under 35 U.S.C. 154(b) by 83 days.

(21) Appl. No.: 15/555,255

(22) PCT Filed: Mar. 4, 2016

(86) PCT No.: PCT/IB2016/051230
§ 371 (c)(1),
(2) Date: Sep. 1, 2017

(87) PCT Pub. No.: WO2016/139632
PCT Pub. Date: Sep. 9, 2016

(65) Prior Publication Data
US 2018/0043396 A1 Feb. 15, 2018

(30) Foreign Application Priority Data

Mar. 5, 2015 (FR) ...................... 15 51861

(51) Int. Cl.
*B07B 1/28* (2006.01)
*B06B 1/16* (2006.01)
(Continued)

(52) U.S. Cl.
CPC .............. *B06B 1/161* (2013.01); *B07B 1/284* (2013.01); *B65G 27/20* (2013.01); *B65G 27/28* (2013.01); *F16H 35/008* (2013.01); *F16H 7/02* (2013.01)

(58) Field of Classification Search
CPC ......... B07B 1/284; B06B 1/161; B06B 1/162; B06B 1/163; B65G 27/20; B65G 27/28; F16H 35/008; F16H 7/02
(Continued)

(56) References Cited

U.S. PATENT DOCUMENTS 5,064,053 A * 11/1991 Baker .................... B65G 27/20
198/753
5,615,763 A * 4/1997 Schieber ................ B65G 27/32
198/751

(Continued)

FOREIGN PATENT DOCUMENTS

DE 9416260 A1 12/1994
EP 0505976 A1 9/1992
(Continued)

OTHER PUBLICATIONS

French Search Report for FR 1 551 861 dated Nov. 9, 2015.
International Search Report for PCT/IB2016/051230 dated Apr. 1, 2016.

*Primary Examiner* — Joseph C Rodriguez
(74) *Attorney, Agent, or Firm* — Andrus Intellectual Property Law, LLP

(57) ABSTRACT

A vibratory system for a screening and/or feeder machine, the vibratory system including shaft lines, each shaft line having an unbalance module, the vibratory system also having a drive device configured to drive the shaft lines in rotation in synchronous manner and in the same direction. The vibratory system also includes an angle modifier device configured to modify the angular position of the unbalance module of one shaft line relative to the angular position of the unbalance module of the other shaft line or of one of the other shaft lines.

10 Claims, 4 Drawing Sheets

(51) Int. Cl.
*B65G 27/20* (2006.01)
*B65G 27/28* (2006.01)
*F16H 35/00* (2006.01)
*F16H 7/02* (2006.01)

(58) Field of Classification Search
USPC .................................. 209/366, 366.5, 367
See application file for complete search history.

(56) References Cited

U.S. PATENT DOCUMENTS

| | | | | |
|---|---|---|---|---|
| 6,145,652 A * | 11/2000 | Durnil | ............... | B06B 1/166 |
| | | | | 198/753 |
| 6,212,445 B1 * | 4/2001 | Barba | ............... | B06B 1/166 |
| | | | | 700/280 |
| 6,504,278 B1 * | 1/2003 | Bald | ............... | B06B 1/166 |
| | | | | 310/81 |
| 6,598,734 B1 * | 7/2003 | Rosenstrom | ............ | B06B 1/166 |
| | | | | 198/758 |
| 8,813,589 B2 * | 8/2014 | Tang | ............... | E02D 7/18 |
| | | | | 74/61 |
| 2015/0340981 A1 * | 11/2015 | Jolly | ............... | B06B 1/161 |
| | | | | 318/114 |

FOREIGN PATENT DOCUMENTS

| | | | |
|---|---|---|---|
| GB | 1301855 A | | 1/1973 |
| WO | 9958258 A1 | | 11/1999 |
| WO | 2014066573 A1 | | 5/2014 |

* cited by examiner

VIBRATORY SYSTEM COMPRISING SHAFT LINES, AND A CORRESPONDING MACHINE AND METHOD

CROSS-REFERENCE TO RELATED APPLICATIONS

This application is the U.S. national stage application of International Application PCT/M2016/051230 filed Mar. 4, 2016, which international application was published on Sep. 9, 2016, as International Publication WO 2016/139632 in the English language. The International Application claims priority of French Patent Application 15 51861, filed Mar. 5, 2015.

BACKGROUND

The invention relates in general manner to vibratory systems. The invention also relates to vibratory machines for screening materials and/or for feeding materials, which machines include vibratory systems.

Vibratory systems are known in the state of the art that comprise two unbalanced shaft lines. Each unbalanced shaft line has a rotary shaft and an unbalance module constrained to rotate with said shaft. The shaft lines are driven in rotation so as to generate vibration for use in screening materials and/or for causing them to advance.

Nevertheless, driving rotation of unbalanced shaft lines in the systems known in the state of the art requires a large amount of energy. In addition, when stopping rotary drive, the vibration frequencies that are generated may include values that correspond to resonant frequencies of certain portions of the machine. In particular, the frequency of vibration may come close to the resonant frequency of damper elements on which the frame of the machine is mounted.

SUMMARY

An object of the present invention is to propose a novel vibratory system and a corresponding vibratory machine making it possible to reduce the energy needed to driving the unbalanced shaft lines and/or to reduce the risk of damage to all or part of the machine.

For this purpose, the invention provides a vibratory system for a screening and/or feeder machine, the vibratory system comprising shaft lines, each shaft line having an unbalance module, said vibratory system also having a drive device configured to drive the shaft lines in rotation in synchronous manner and in the same direction, said vibratory system being characterized in that it also comprises an angle modifier device configured to modify the angular position of the unbalance module of one shaft line relative to the angular position of the unbalance module of the other shaft line or of one of the other shaft lines.

In other words, the angle modifier device makes it possible to modify the angular position of the unbalance modules relative to each other when the vibratory system has two shaft lines, or to modify the angular positions of the unbalance modules relative to one another when the number of shaft lines is greater, e.g. three, four, or more. The shaft lines are parallel and are spaced apart from one another along a direction which is transversal, preferably orthogonal, to the longitudinal direction of said shaft lines. In other words, the shaft lines are not aligned with one another but are disposed side by side. The relative angular position of the unbalance modules is referred to as the angular configuration of the unbalance modules.

By way of example, when there are n shaft lines, a given angular configuration of the unbalance modules may be represented in the form of an (n−1)-tuplet of angle values, with each angle value of the (n−1)-tuplet corresponding to the angular phase difference, i.e. the angular position difference, between the unbalance module of a respective line and the unbalance module of a neighboring line.

The angular orientation axis of an unbalance module is defined as being the axis intersecting and orthogonal to the axis of rotation of the unbalance module and passing through the center of gravity of the unbalance module. The angular position of an unbalance module corresponds to the angle between the angular orientation axis of the unbalance module and a reference axis that is orthogonal to and that intersects the axis of rotation of the unbalance module. Once a first reference axis has been defined for an unbalance module of a shaft line, the reference axis of the unbalance module of each other line is an axis that is orthogonal to and that intersects the axis of rotation of the unbalance module of said other line and that is parallel to said first reference axis.

The device may be configured to pivot the unbalance module of one, several, or each of the shaft lines, depending on the number of shaft lines provided, so as to modify the angular configuration of said unbalance modules of the shaft lines.

Such a design for the vibratory system of the invention in which the unbalanced shaft lines can be driven in rotation in the same direction and in which the unbalance module of at least one of the lines can be angularly adjusted, makes it possible to generate circular vibration of amplitude that is adjustable and with reduced energy consumption.

The angle modifier device serves to adjust the angular phase difference between the unbalance modules of the shaft lines during different operating sequences of the vibratory system.

Adjusting the angle of the unbalance module of at least one of the lines makes it possible in particular to reduce or even eliminate the static moment of the set of unbalance modules so that, when starting to drive rotation, the energy required for providing such drive is limited, and when stopping rotary drive, the risk of the system generating frequencies close to the resonant frequencies of certain portions of the system or of the corresponding machine is limited.

Thus, during a sequence of starting the system, the angle modifier device may be used to obtain a configuration in which the unbalance modules of the shaft lines are in phase opposition. When the vibratory system has two shaft lines, a configuration in phase opposition corresponds to an angular position difference of 180° between the two unbalance modules. In another example, when the vibratory system has three shaft lines, each having a respective unbalance module, a configuration in phase opposition corresponds to an angular position difference of 120° between the unbalance modules of the first and second lines, and to an angular position difference of 120° between the unbalance modules of the second and third lines. The static moment of the set of unbalance modules is then zero, thereby reducing the energy needed for driving the shaft lines in rotation.

During an operating sequence, also referred to as "production mode", the angle modifier device can be used to modify the angular configuration of the unbalance modules of the shaft lines so as to adapt the level of vibration to the quality and the quantity of material that is to be screened and/or caused to advance.

In order to stop the system, the angle modifier device may be used to bring the unbalance modules into phase opposition so as to limit any risk of all or part of the system or of the machine entering into resonance.

According to an advantageous characteristic of the invention, the drive device comprises:
 a motor, referred to as the "main" motor, configured to drive one of the shaft lines in rotation; and
 a synchronous transmission mechanism configured to transmit rotation from the shaft line driven by the main motor to the other shaft line(s) so that said shaft lines rotate in synchronous manner and in the same direction.

According to an advantageous characteristic of the invention, the vibratory system also comprises a control unit configured to control the drive device and the angle modifier device, the angle modifier device enabling the unbalance modules to take up an angular position relative to one or each of the others, referred to as a "first" angular configuration, in which the set of unbalance modules presents a static moment of a first value, and another angular position relative to one or each of the others, referred to as the "second" angular configuration, in which the set of unbalance modules presents a static moment having a second value smaller than said first value.

According to an advantageous characteristic of the invention, the control unit is configured, prior to driving the shaft lines in rotation by means of the drive device, so as to bring the unbalance modules into the second angular configuration.

According to an advantageous characteristic of the invention, the control unit is configured, when the unbalance modules are in the second angular configuration and after a given speed of rotation has been reached for the shaft lines, so as to bring the unbalance modules into said first angular configuration.

According to an advantageous characteristic of the invention, the control unit is configured, while the shaft lines are being driven in rotation by the drive device, so as to modify the amplitude of the vibration by modifying the angular position of the unbalance module of one shaft line relative to the angular position of the unbalance module of the other shaft line or of one of the other shaft lines.

According to an advantageous characteristic of the invention, the control unit is configured, prior to stopping rotary drive of the shaft lines, so as to bring the unbalance modules into the second angular configuration.

According to an advantageous characteristic of the invention, the control unit is configured, when rotation of the shaft lines is stopped, so as to bring the unbalance modules into the first angular position.

According to an advantageous characteristic of the invention, the angle modifier device comprises a motor, referred to as the "adjustment" motor, and an epicyclic gear train, the epicyclic gear train comprising a sun gear connected to the outlet shaft of the adjustment motor, a toothed ring connected to one of the shaft lines, and planets mounted to mesh with the toothed ring and with the sun gear, the angle modifier device also comprising a planet carrier that carries the planets and that is coupled to rotate with the other shaft line.

According to an advantageous characteristic of the invention, the adjustment motor is configured in such a manner that its outlet shaft is suitable firstly for rotating in one direction in order to modify the angular position of an unbalance module, and secondly for preventing rotation in the opposite direction.

The invention also provides a screening and/or feeder vibrator machine including a vibratory system and characterized in that the vibratory system is as described above.

The invention also provides a method of controlling a vibratory system as described above, said method being characterized in that it comprises at least one step of modifying the angular position of an unbalance module relative to the angular position of the other unbalance module(s).

According to an advantageous characteristic of the invention, when the shaft lines are stationary, said method comprises the following steps:
 putting the unbalance modules into the second angular configuration; and
 driving the shaft lines in rotation by means of the drive device.

According to an advantageous characteristic of the invention, when the unbalance modules are in the second angular configuration, said method comprises the following steps:
 reaching a given speed of rotation for the shaft lines; and
 putting the unbalance modules into said first angular configuration.

According to an advantageous characteristic of the invention, while the shaft lines are being driven in rotation by the drive device, said method includes the step of modifying the amplitude of vibration by modifying the angular position of the unbalance module of one shaft line relative to the angular position of the unbalance module of the other shaft line or of one of the other shaft lines.

According to an advantageous characteristic of the invention, prior to beginning stopping the rotary drive of the shaft lines, said method comprises a step of bringing the unbalance modules into the first angular position.

According to an advantageous characteristic of the invention, when rotation of the shaft lines is stopped, said method includes a step of bringing the unbalance modules into the first angular position.

BRIEF DESCRIPTION OF THE DRAWINGS

The invention can be well understood on reading the following description of embodiments, given with reference to the accompanying drawings, in which.

DETAILED DESCRIPTION OF THE DRAWINGS

Figure 1:
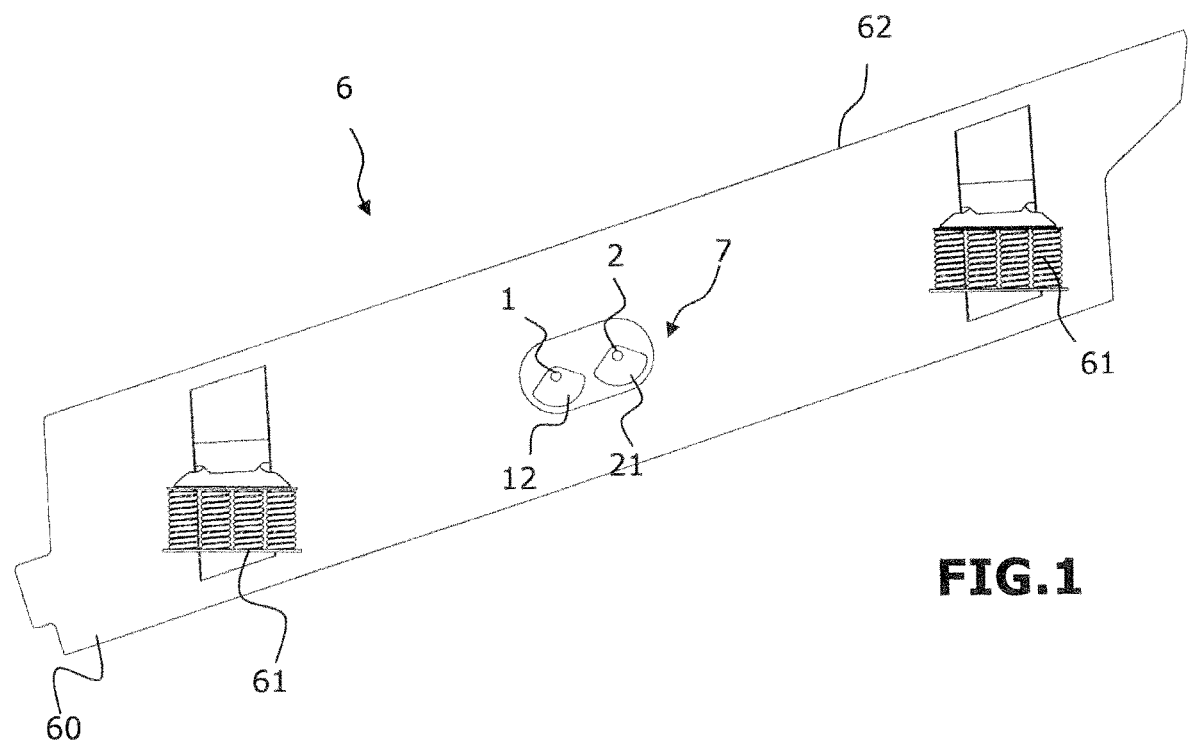
FIG. 1 is a diagrammatic side view of a machine in an embodiment of the invention.
Figure 2:
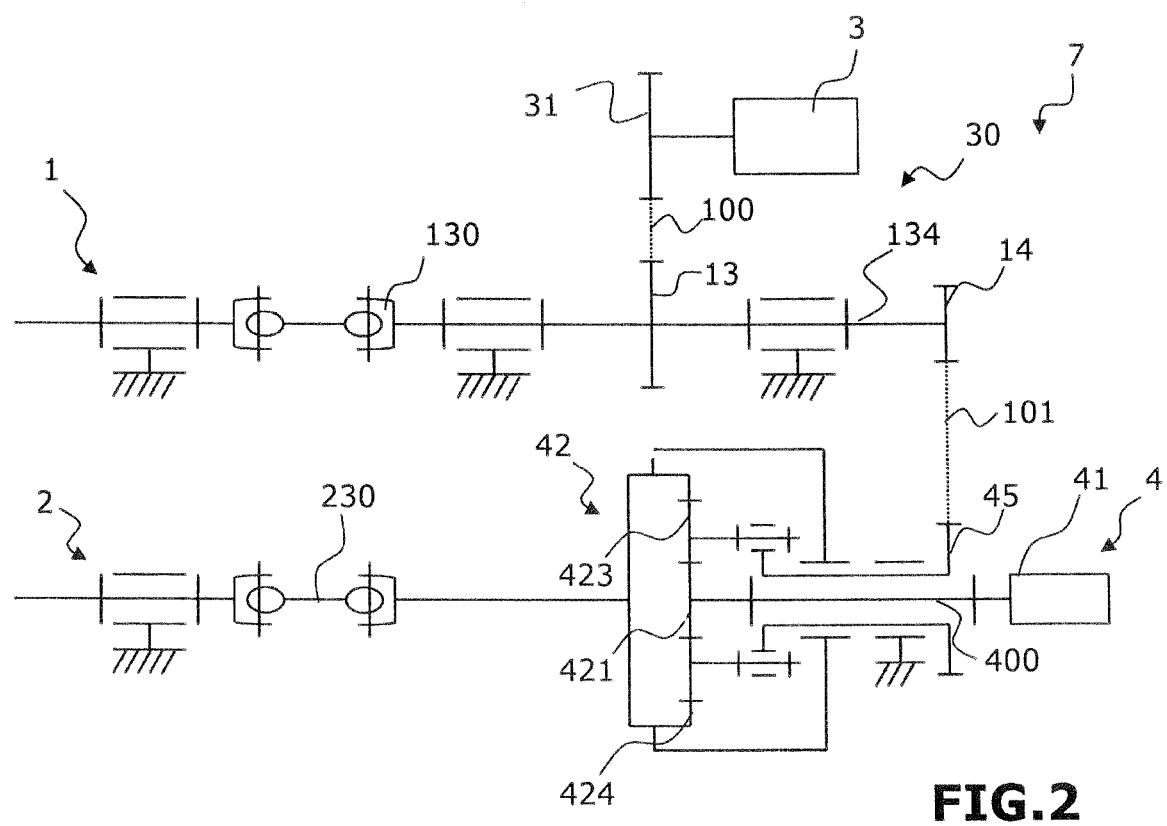
FIG. 2 is a diagram of the vibratory system of the machine in an embodiment of the invention.

With reference to the figures and as mentioned above, the invention relates to a vibrator machine 6 for screening and/or moving materials, such as aggregates or ores.

Screening is an operation of grading materials depending on their grain size. The vibrator machine can thus be used to perform grain size classification or for feeding materials in various fields such as public works, buildings, mines, or quarries.

The machine 6 comprises a frame 60 and a surface 62 for screening and/or moving materials carried by said frame 60. Said surface may be made in the form of panels or plates, e.g. made of rubber, or a taut cloth. For screening, said surface presents through gaps and/or meshes of size appropriate for the desired type of screening.

The frame 60 of the machine 6 is arranged on damper means such as springs 61. The springs 61 then act as a suspension and they serve to isolate vibration. In other words, the machine comprises a frame 60 that is resiliently mounted.

The machine 6 has a vibratory system 7 that serves to generate vibration. The vibratory system 7 is arranged to cause the surface 62 to vibrate. In particular, the vibratory system comprises support elements (not shown) that are fastened to the frame 60 of the machine 6. The support elements carry bearings 56 for passing the shafts of unbalanced shaft lines of the vibratory system 7, as described below.

In the example shown in the figures, the vibratory system 7 thus includes two unbalanced shaft lines 1 and 2. In a variant, the vibratory system may have a larger number of shaft lines, e.g. three or four shaft lines, provided with respective unbalance modules. The shaft lines are parallel and preferably horizontal. Each unbalanced shaft line 1, 2 comprises a shaft or a plurality of shafts constrained to rotate with one another, and one or more unbalance modules 12, 21 mounted so as to be constrained to rotate with the corresponding shaft(s) of the line. Said shaft may then comprise a plurality of shaft fractions connected to one another, e.g. via universal joints, as in the example shown in FIG. 4.

The term "unbalance" weight is used to mean a body mounted on a shaft line and having its center of gravity off-center relative to the axis of rotation of said shaft line. In the example shown in the figures, each unbalance module comprises a plurality of unbalance weights. In particular, an unbalance module may be constituted by a single unbalance weight.

In the example shown in the figures, each unbalance module 12, 21 comprises two pairs of unbalance weights. The two pairs of each unbalance module 12, 21 are distributed spaced apart from one another along the shaft. The two pairs of each unbalance module 12, 21 are separated from each other by a universal joint 130, 230.

Figure 3A:
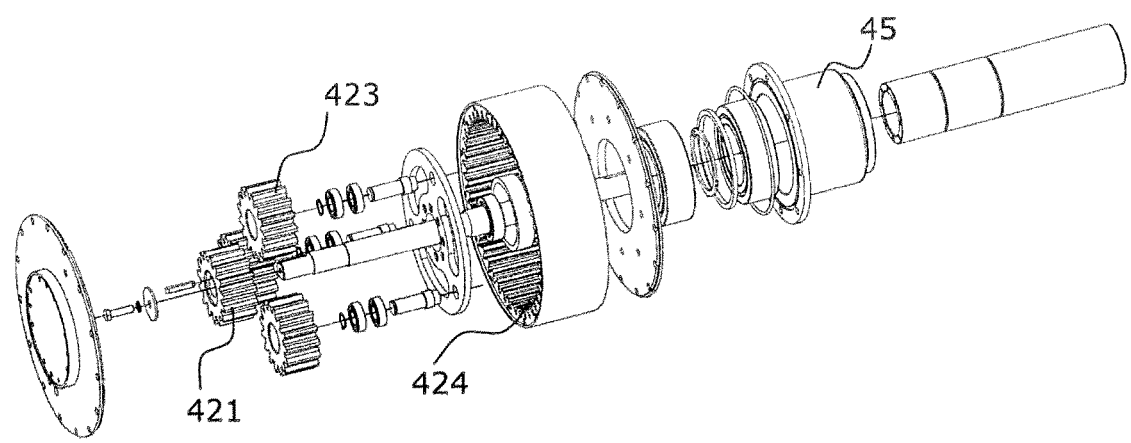
FIG. 3A is an exploded perspective view of the epicyclic gear train of the vibratory system of the machine in an embodiment of the invention.
Figure 3:
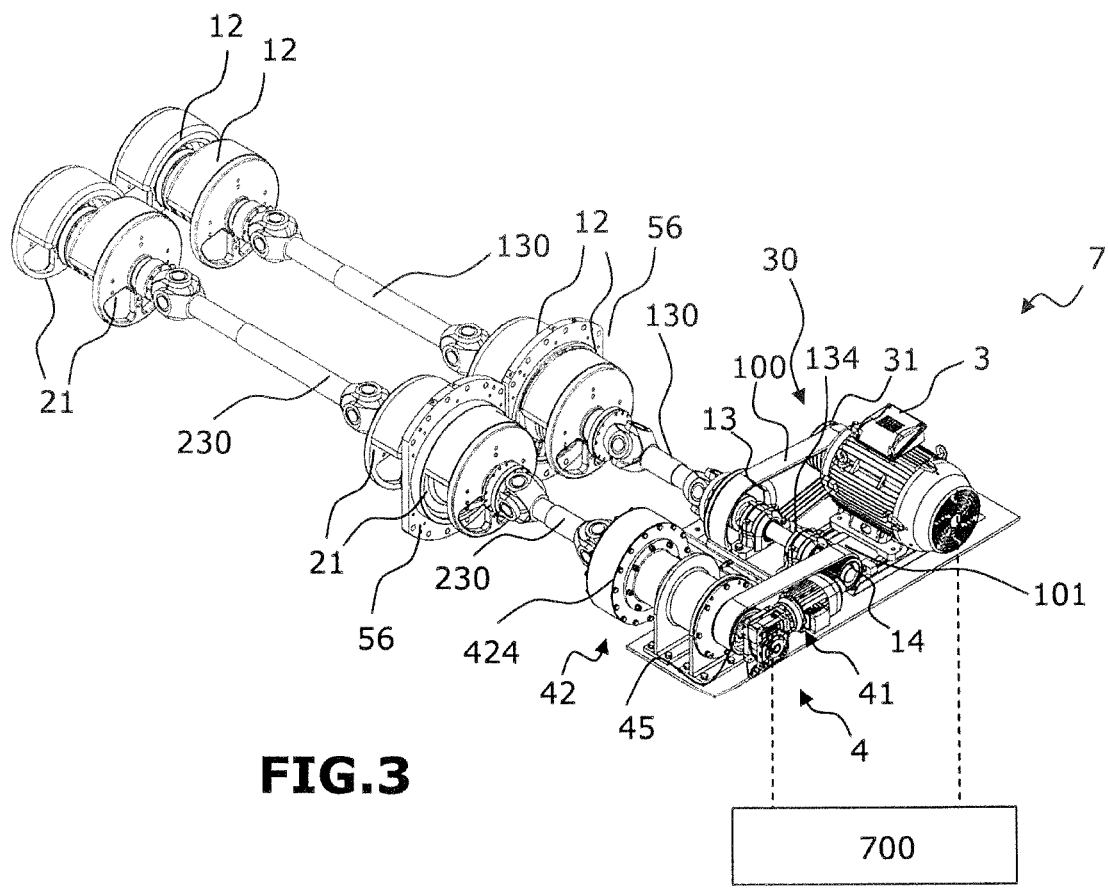
FIG. 3 is a perspective view of the vibratory system of the machine in an embodiment of the invention, the unit for controlling the motors being shown diagrammatically.

The two unbalance weights of a pair are separated from each other along the shaft line by a shaft bearing 56 secured via a support element (not shown) to the frame 60 of the machine 6. In the example of FIG. 3, only one bearing 56 is shown for each shaft line.

In the example shown in FIG. 1, the screening and/or movement surface 62 is sloping and offset from the plane containing the axes of rotation of the unbalanced shaft lines.

Said vibratory system 7 also has a motor 3, referred to as the "main" motor, in engagement with the first shaft line 1. In a variant that is not shown in the figures, the shaft line that is engaged with the main motor 3 could be the second shaft line 2. Said system also has a synchronous transmission mechanism 30 configured so that rotation of the shaft line 1 that is driven in rotation under the control of the main motor 3 is synchronous with and in the same direction as the direction of rotation of the second shaft line 2. Thus, the first and second shafts rotate at the same speed of rotation relative to each other, possibly being in-phase or out-of-phase, as a function of steps in the operation of the machine as described below.

The synchronous transmission system 30 is thus configured so that the unbalanced shaft lines are driven in rotation by the motor 3 at the same speed and in the same direction.

The synchronous transmission system 30 comprises a wheel 31 fastened to the outlet shaft of the main motor 3, a shaft 134 constrained to rotate with the shaft line 1, a wheel 13 secured to the shaft 134, and a transmission belt 100 between the wheel 31 and the wheel 13. The synchronous transmission system 30 also has a wheel 14 fastened to the shaft 134, and a wheel 45 coupled by a belt 101 to the wheel 14. The wheel 45 is carried by, but is suitable for rotating relative to, the outlet shaft 400 of a motor 41 that is referred to as the "adjustment" motor. The transmission system also has a toothed ring 424 coupled to rotate with planet gears 423 carried by the wheel 45 that constitutes a planet carrier. The shaft 134 and the ring 424 of the synchronous transmission system are connected respectively to the shaft lines 1 and 2 by the universal joints 130 and 230.

The ring 424, the planet gears 423, and the planet carrier 45 form part of an epicyclic gear train 42 that is described below. The epicyclic gear train has a sun gear 421 connected to the outlet shaft of the adjustment motor 41, that is described below. The epicyclic gear train also has the outer toothed ring 424, which is connected to the second shaft line 2, and planets 423 mounted to mesh with the toothed ring 424 and with the sun gear 421. The epicyclic gear train 42 also has a planet carrier 45 that carries the planets 423 so that rotation of the planet carrier 45 drives the planets 423 in rotation.

The vibratory system 7 has an angle modifier device configured to modify the angular position of the unbalance module 21 of the second shaft line 2 relative to the angular position of the unbalance module 12 of the first shaft line 1. In a variant not shown in the figures, the angle modifier device may be configured to modify the angular position of the unbalance module of the first shaft line or to modify the angular positions of each of said shaft lines. More generally, when the vibratory system 7 has a number n of shaft lines provided with respective unbalance modules, where n is greater than or equal to 2, it is possible to make provision for the angle modifier device to be configured to modify the angular positions of n−1 shaft lines in order to be able to modify the static moment of the set of unbalance modules, as described below.

In the example shown in the figures, the angle modifier device 4 comprises the epicyclic gear train 42 and the adjustment motor 41. The motor 41 presents an outlet shaft 400 having the sun gear 421 mounted thereon to rotate therewith.

Preferably, the adjustment motor 41 is a gear motor, i.e. a motor with a stepdown gear, thus enabling the outlet shaft of the adjustment motor 41 to rotate at a speed that is small compared with the speed of rotation of the motor 4, and with torque that is high.

As described in detail below, the adjustment motor and the epicyclic gear train 42 serve to modify the angular position of the unbalance module 21 of the shaft line 2, thereby introducing an angular phase difference between the unbalance module 21 of the second shaft line 2 and the unbalance module 12 of the first shaft line 1, or enabling them to be brought into phase, i.e. into the same angular position.

Below, the orientation axis O12 or O21 of an unbalance weight of a shaft line 1, 2 is defined as being the axis perpendicular to the axis of the shaft line and passing through the center of gravity of said unbalance weight and through the axis of said shaft line.

The angular phase difference between the unbalance modules, or indeed the angular position difference between the unbalance modules, corresponds to the difference between the angular position of one unbalance module and the angular position of the other unbalance module.

The angular position of an unbalance module is defined as the angle A12, A21, referred to as the "orientation" angle, that is formed in one direction between firstly a given reference axis perpendicularly intersecting the axis of rotation of said unbalance module (i.e. the axis of the corresponding shaft) and secondly the orientation axis O12, O21 of said unbalance module, as defined above.

Said orientation angle lies in a plane perpendicular to the axes of rotation of the shaft lines. In the embodiment shown in FIG. 4C, which is an end view of the shaft lines, i.e. in a plane perpendicular to their axes of rotation, the reference axis for each unbalance module 12, 21 is selected as being the portion of the vertical axis V12, V21 that intersects the axis of rotation of said unbalance module and that extends below said axis of rotation. In addition, in the embodiment shown in FIG. 4C, said orientation angle is defined in the counterclockwise direction, going from the reference axis to the orientation axis of the unbalance weight.

In other words, the angular phase difference between the unbalance modules 12, 21 corresponds to the difference between their orientation angles A12 and A21.

In the embodiment shown in the figures, for a given shaft line, the unbalance weights of the line have the same angular position from one weight to another, such that the angular orientation of an unbalance weight of a shaft line corresponds to the angular orientation of the unbalance module of said line. When an unbalance module has unbalance weights that are at different angular phases relative to one another, it may be considered that the angular position of the unbalance module corresponds to the mean of the orientation angles of the unbalance weights of the unbalance module.

The angle modifier device 4 thus serves to bring the unbalance modules 21, 12 into a first angular configuration, e.g. into phase opposition, so that the set of unbalance modules presents a static moment of a first value. The angle modifier device 4 also makes it possible to bring the unbalance modules into a second angular configuration, e.g. in-phase, so that the set of unbalance modules presents a static moment of a second value that is smaller than said first value.

In order to adjust the angular position of the unbalance module 21, the motor 41 operates at low speed with high torque. The motor 41 is configured so that rotation of its output shaft 400 is irreversible, so that when the desired angular phase difference between the unbalance modules is reached, rotation of the sun gear 421 is prevented, since otherwise that would modify the angular orientation of the unbalance module 21 of the line 2 in unwanted manner.

The vibratory system 7 includes a control unit 700. The control unit is a unit of electronic and/or computer type, e.g. comprising a microcontroller or a microprocessor associated with a memory. Advantageously, the vibratory system also comprises a detector system for detecting the angular positions of the unbalance modules of the shaft lines. The detector system may comprise one or more sensors connected to the control unit in order to determine the angular phase difference between the unbalance modules of the shaft lines. The sensor(s) may be configured to detect the relative angular position between the unbalance modules or to determine the pivot angles of the or each shaft line controlled by the angle modifier device 4. Thus, in the embodiment shown in the figures, the motor 41 may be fitted with an angle measuring system for measuring the pivot angle of its outlet shaft and for deducing therefrom the angular phase difference that exists between the unbalance modules of the shaft lines.

Thus, when it is stated that the unit or means of the unit are configured to perform a given operation, it should be understood that the unit has computer instructions and corresponding execution means that enable said operation to be performed.

In particular, the control unit 700 includes instructions for controlling the speed of rotation of the main motor 3 and the angle of rotation of the outlet shaft 400 of the motor 41.

When the vibratory system is stationary and in order to put it into operation, the control unit 700 is configured to execute the following steps.

Figure 4:
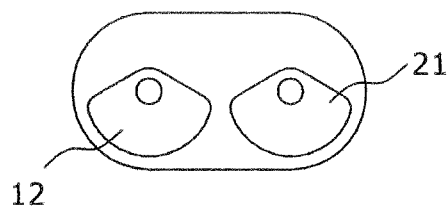
FIGS. 4 to 4E are diagrammatic end views of the unbalanced shaft lines of the vibratory system in an embodiment, shown at different instants, starting from the shaft lines being completely stopped, the shaft lines then being driven in rotation so as to reach a desired given speed.

Initially, the unbalance modules 12 and 21 of the first and second shaft lines 1 and 2 are stationary and in the same angular position, i.e. in-phase, and preferably in a low position, as shown in FIG. 4.

Figure 4A:
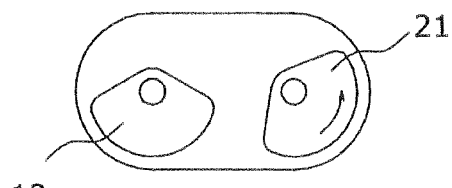

In a first step, shown in FIG. 4A, the angular position of the unbalance module 21 of the second shaft line 2 is modified by using the motor 41 so that the unbalance module 21 is taken to an angular position referred to as the "starting" angular position, that is different from the angular position of the unbalance module 12 of the first shaft line 1. Relatively to a given reference axis which is parallel to the axes of rotation of the lines, in the starting position, the static moment of the set of unbalance modules, referred to as the "total" static moment, is thus less than the moment corresponding to a configuration of the unbalance modules in which they present the same angular position. In this example, the values of the total static moments are considered as absolute values. The energy needed by the motor 3 for driving rotation of the unbalanced shaft lines is thus reduced.

The static moment of the set of unbalance modules 12 and 21, referred to as the "total" static moment, is defined relative to an axis parallel to the axes of rotation of the lines, coplanar therewith, and situated at equal distances from these two axes of rotation. When the number n of parallel and coplanar shaft lines is greater than two, the static moment of the set of unbalance modules, referred to as the "total" static moment, can be defined relative to an axis parallel to the axes of rotation of the lines, coplanar therewith, and situated at equal distances from the two shaft lines that are furthest apart.

Figure 4B:
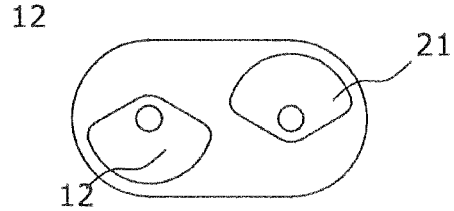

Preferably, the unbalance modules 12 and 21 are put into phase opposition, as shown in FIG. 4B. The total static moment is then zero.

Figure 4C:
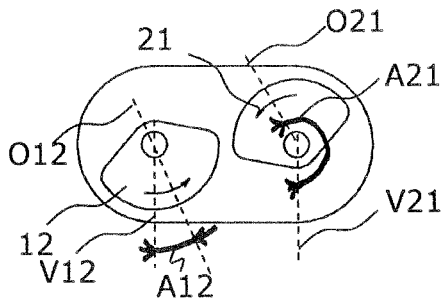

The control unit 700 then causes the first and second shaft lines 1 and 2 to be rotated by the motor 3 in order to reach a given speed, referred to as the "nominal" operating speed, as shown in FIG. 4C. During this step, i.e. until they have reached the nominal operating speed, the unbalance modules of the shaft lines are kept in phase opposition.

Figure 4D:
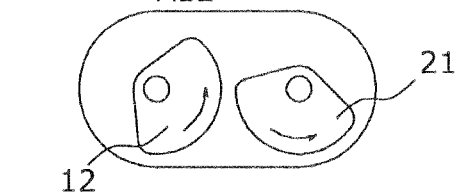
Figure 4E:
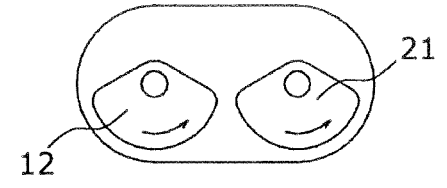

Thereafter, the control unit controls the motor 41 so that, as shown in FIG. 4D, the angular position of the unbalance module 21 of the second shaft line 2 is modified in order to bring the unbalance modules into an angular position, referred to as the "vibratory" angular position, in which the total static moment is greater than that corresponding to said starting angular position. As shown in FIG. 4E, the unbalance module 21 is preferably put into the same angular position as the unbalance module 12. Thus, in the operating step shown in FIG. 4E, the vibratory system is operating at the nominal speed of rotation and with an amplitude of vibration that is at a maximum since the unbalance modules of both lines are in-phase.

The control unit 700 can cause the amplitude of vibration to be modified by modifying the angular position of the unbalance module 21 of the second shaft line 2 relative to the angular position of the unbalance module 12 of the first shaft line 1.

Figure 5:
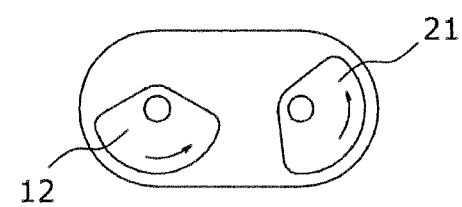
FIG. 5 is a diagrammatic end view of the unbalanced shaft lines of the vibratory system of the machine in an embodiment, said view showing the angular phase difference introduced between the unbalance weights while they are rotating at a given speed.

The amplitude of vibration of the vibratory system can be reduced, as shown in FIG. 5, by introducing an angular phase difference between the unbalance modules. As explained above, the angular phase difference is introduced by controlling the motor 41 in such a manner as to cause the sun gear 421 of the epicyclic gear train to turn through a desired angle. The amplitude of vibration can thus be adjusted progressively to a value lying in the range 0 to 100%.

Figure 6:
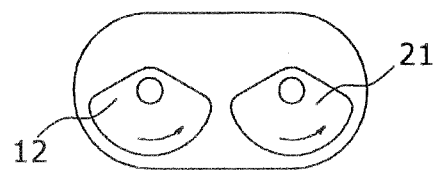
FIGS. 6 to 6E are diagrammatic end views of the unbalanced shaft lines of the vibratory system of the machine in an embodiment, shown at different moments, starting with the shaft lines rotating at a desired given speed until they come to rest.

In order to stop the vibratory system while the two shaft lines are being driven in rotation by the motor 3 at the nominal operating speed and in-phase, as shown in FIG. 6, the control unit performs the following steps corresponding to steps that are the inverse of those described above with reference to FIGS. 4 to 4E.

Figure 6A:
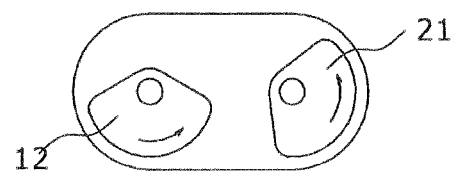
Figure 6B:
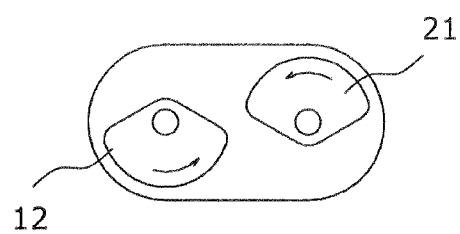
Figure 6C:
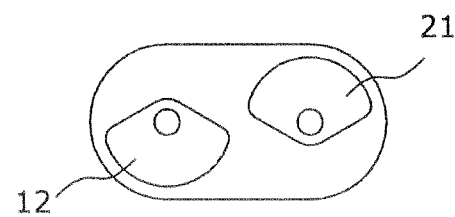
Figure 6D:
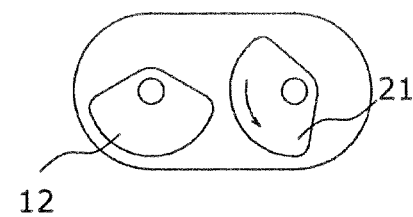
Figure 6E:
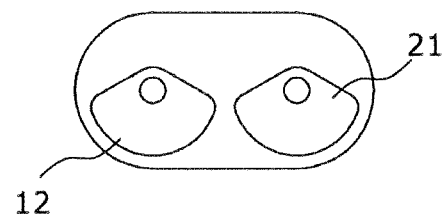

In the step shown in FIG. 6A, the motor 41 modifies the angular position of the unbalance module 21 of the second shaft line 2 until the angular positions of the unbalance modules 12 and 21 of the first and second lines 1 and 2 are in opposition (FIG. 6B). The amplitude of vibration is then at a minimum. Thereafter, as shown in FIG. 6C, the rotary drive of the shaft lines 1 and 2 is stopped so that the shaft lines cease turning without running any risk of causing some or all of the machine to enter resonance. Thereafter, as shown in FIGS. 6D and 6E, the unbalance module 21 is pivoted by the motor 41 so as to modify its angular position and preferably, as shown in FIG. 6E, so as to bring it into the same angular position as the unbalance module 12. In particular, the unbalance modules are brought into a low position such that the potential energy of these unbalance modules is zero, thereby making it possible to act in safe manner on the system, e.g. for maintenance purposes.

The present invention can advantageously be used for screening materials in mines and quarries, and/or for feeding a machine for processing said materials.

The person skilled in the art readily understands that the various steps and functions of the embodiments described above can be performed by means of computer programs. In particular, the above-described steps may be embodied in the form of electronic and/or computer instructions that are executable by the control unit 700. In particular, the functions executed by the control unit may be embodied in the form of a set of computer instructions executed by a processor of the control unit 700.

The computer programs or computer instructions may be contained in program storage devices, for example computer readable digital data storage media, or executable programs. The programs or instructions may also be executed from program storage peripherals.

Although at least one embodiment of the invention is shown and described, it should be observed that other modifications, substitutions, and alternatives, will appear to the person skilled in the art and can be changed without going beyond the ambit of the presently described subject matter.

The present application seeks to cover all adaptations and variations of the above-described embodiments. In addition, the term "comprising" does not exclude other elements or steps and the term "a" does not exclude the plural. In addition, characteristics or steps that are described with reference to one of the above-described embodiments may also be used in combination with other characteristics or steps of other above-described embodiments. It should be observed that the ambit of the patent extends to include all of the modifications envisaged above insofar as they form part of the contribution of the inventors to the prior art. Such modifications, substitutions, and alternatives may be implemented without going beyond the ambit and the spirit of the present invention.

The invention claimed is:

1. A vibratory system for a screening and/or feeder machine, the vibratory system comprising:
a plurality of shaft lines, each shaft line having an unbalance module;
a drive device configured to drive the shaft lines in rotation in synchronous manner and in the same direction;
an angle modifier device configured to modify the angular position of the unbalance module of a first one shaft line of the plurality of shaft lines relative to the angular position of the unbalance module of a second shaft line of the plurality of shaft lines, the unbalance modules being capable of taking up a relative first angular position, in which the unbalance modules are in phase and a relative second angular position, in which the unbalance modules are in phase opposition;
a control unit configured to control the drive device and the angle modifier device, said control unit including a processor and computer instructions which, when executed by the processor, causes the processor to:
prior to driving the shaft lines in rotation by means of the drive device, bring the unbalance modules into phase opposition;
drive the shaft lines in rotation by means of the drive device;
keep the unbalance modules of the shaft lines in phase opposition until the unbalance modules have reached a given operating speed;
after said given speed of rotation has been reached for the shaft lines, bring the unbalance modules in phase;
prior stopping rotary drive of the shaft lines, bring the unbalance modules into phase opposition; and
stop the rotary drive of the shaft lines when said unbalance modules have been brought into phase opposition.

2. The vibratory system according to claim 1, wherein the drive device comprises:
a main motor configured to drive one of the plurality of shaft lines in rotation; and
a synchronous transmission mechanism configured to transmit rotation from the shaft line driven by the main motor to another shaft line so that the plurality of shaft lines rotate in synchronous manner and in the same direction.

3. The vibratory system according to claim 1, wherein the control unit further includes computer instructions which, when executed by the processor, causes the processor to: while the shaft lines are being driven in rotation by the drive device, modify the amplitude of the vibration by modifying the angular position of the unbalance module of one shaft line relative to the angular position of the unbalance module of another shaft line.

4. The vibratory system according to claim 1, wherein the control unit further includes computer instructions which, when executed by the processor, causes the processor to: when rotation of the shaft lines is stopped, bring the unbalance modules in phase and into a low position.

5. A screening and/or feeder vibrator machine including a vibratory system and wherein the vibratory system is in accordance with claim 1.

6. A vibratory system for a screening and/or feeder machine, the vibratory system comprising:
   a plurality of shaft lines, each shaft line having an unbalance module;
   a drive device configured to drive the shaft lines in rotation in synchronous manner and in the same direction;
   an angle modifier device configured to modify the angular position of the unbalance module of a first one shaft line of the plurality of shaft lines relative to the angular position of the unbalance module of a second shaft line of the plurality of shaft lines, the unbalance modules being capable of taking up a relative first angular position, in which the set of unbalance modules presents a static moment of a first value, wherein the angle modifier device comprises an adjustment motor and an epicyclic gear train, the epicyclic gear train comprising a sun gear connected to the outlet shaft of the adjustment motor, a toothed ring connected to one of the shaft lines, and planets mounted to mesh with the toothed ring and with the sun gear, the angle modifier device also comprising a planet carrier that carries the planets and that is coupled to rotate with the other shaft line
   a control unit configured to control the drive device and the angle modifier device, said control unit including a processor and computer instructions which, when executed by the processor, causes the processor to, prior stopping rotary drive of the shaft lines:
      bring the unbalance modules into a second angular configuration in which the set of unbalance modules presents a static moment having a second value smaller than said first value; and
      stop the rotary drive of the shaft lines when said unbalance modules have been brought into the second angular configuration.

7. The vibratory system according to claim 6, wherein the adjustment motor is configured in such a manner that its outlet shaft is suitable firstly for rotating in one direction in order to modify the angular position of an unbalance module, and secondly for preventing rotation in the opposite direction.

8. A method of controlling a vibratory system including a plurality of shaft lines each including an unbalance module, wherein said method comprises the steps of:
   providing a drive device configured to drive the plurality of shaft lines in rotation in synchronous manner and in the same direction;
   providing an angle modifier device configured to modify an angular position of the unbalance module of a first one shaft line of the plurality of shaft lines relative to an angular position of the unbalance module of a second shaft line of the plurality of shaft lines, the unbalance modules being capable of taking up a relative first angular position in which the unbalance modules are in phase and a relative second angular position in which the unbalance modules are in phase opposition;
   providing a control unit configured to control the drive device and the angle modifier device;
   prior to operating the drive device to rotate the plurality of shaft lines, bringing the unbalance modules into the relative second angular position in which the unbalance modules are in phase opposition;
   operating the drive device to rotate the shaft lines with the unbalance modules in phase opposition;
   keeping the unbalance modules of the shaft lines in phase opposition until the unbalance modules have reached a given operating speed;
   after reaching the given operating speed, bringing the unbalance modules into the relative first angular position in which the unbalance modules are in phase;
   prior stopping the rotary drive of the shaft lines, bringing the unbalance modules into the relative second angular position in which the unbalance modules are in phase opposition; and
   stopping the rotary drive of the shaft lines after the unbalance modules have been brought into phase opposition.

9. The method according to claim 8, wherein while the shaft lines are being driven in rotation by the drive device, said method includes the step of modifying the amplitude of vibration by modifying the angular position of the unbalance module of one shaft line relative to the angular position of the unbalance module of another shaft line.

10. The method according to claim 8, wherein when rotation of the shaft lines is stopped, said method includes a step of bringing the unbalance modules in phase and into a low position.

* * * * *